UNITED STATES PATENT OFFICE.

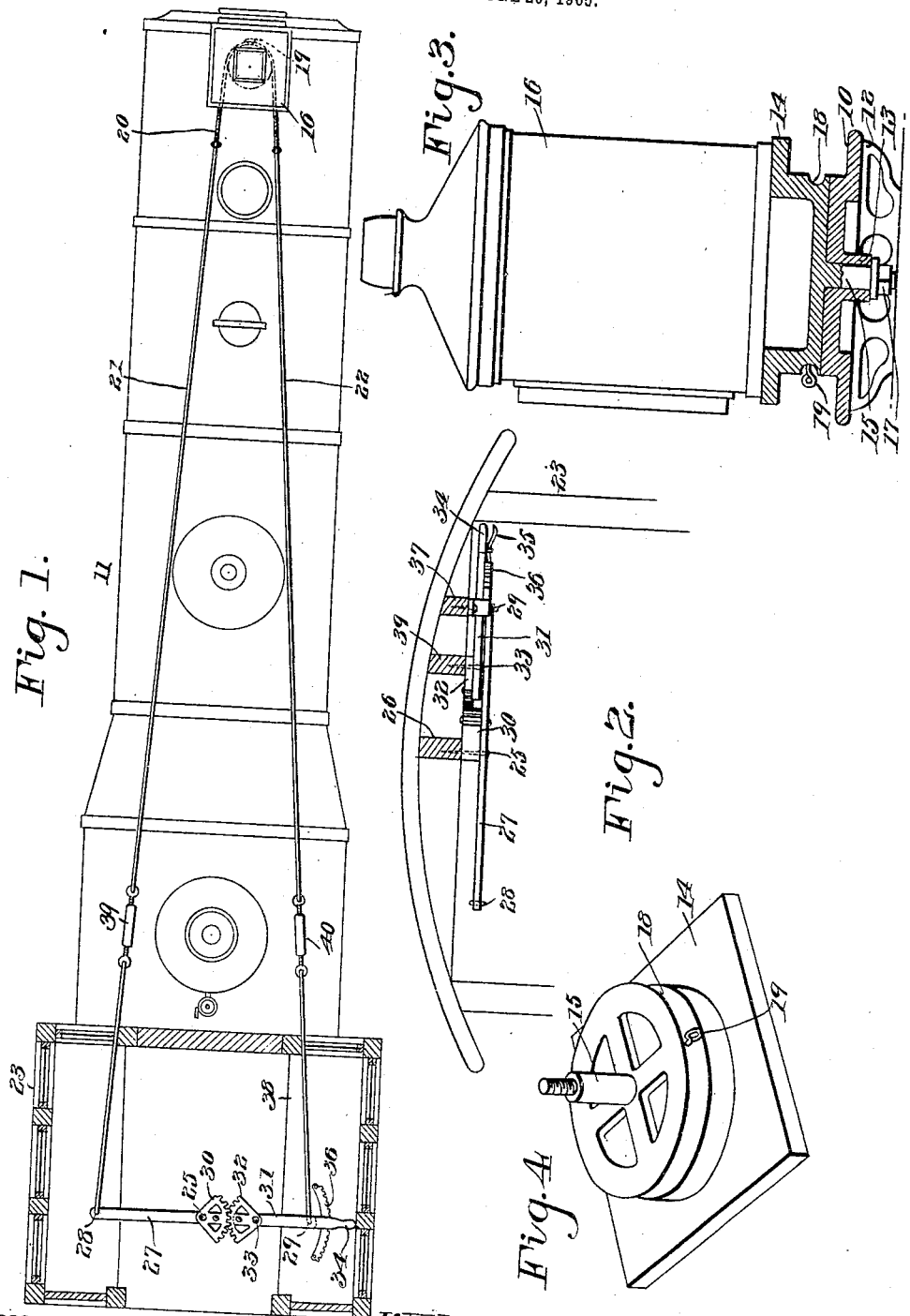

WILLIAM H. DONALDSON, OF JOLIET, ILLINOIS.

OPERATING HEADLIGHTS OF LOCOMOTIVES.

No. 813,692.　　　Specification of Letters Patent.　　　Patented Feb. 27, 1906.

Application filed June 20, 1905. Serial No. 266,132.

*To all whom it may concern:*

Be it known that I, WILLIAM H. DONALDSON, a citizen of the United States, residing at Joliet, in the county of Will and State of Illinois, have invented a new and useful Operating Headlights of Locomotives, of which the following is a specification.

This invention relates to devices for controlling the position of the headlights of locomotives and for similar purposes, and has for its object to provide a simply-constructed and easily-applied device operative from the cab and under the control of the engineer whereby the headlight may be turned to throw the rays of light from side to side to any desired extent.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a plan view of a locomotive with the cab in horizontal section and with the improved devices applied. Fig. 2 is a transverse section, enlarged, of the upper portion of the cab of the locomotive on the line 2 2 of Fig. 1. Fig. 3 is a sectional side elevation, enlarged, of the headlight and the swivel-base on which it is mounted, the base being in section. Fig. 4 is an inverted perspective view, enlarged, of the upper member of the swivel mechanism.

The locomotive is represented as a whole at 11 and provided with a bracket 10 at the forward end formed with a flat upper surface and with a central socket 13 depending therefrom.

Mounted for rotation upon the bracket member 10 is a swivel-plate 14, having a stud 15 operating in the socket 13 and supporting the headlight 16 of the usual construction. The lower end of the stud 15 is provided with means, such as a nut 17, for securing the swivel-plate in position while leaving it free to be rotated. Formed in the swivel member 14 is a cable-groove 18, having means, such as an eye or pin 19, for the attachment of a section of cable 20, and leading thence from opposite sides to rods 21 22, the latter extending into the cab of the locomotive, (indicated at 23.) Pivoted at its center, as at 25, to a bracket 26, depending from the ceiling of the cab 23, is a lever-arm 27, the rods 21 22 being connected, as at 28 29, to the ends of this lever-arm, which for the purpose of this description will be referred to as the "primary" lever-arm. Attached rigidly to the primary lever-arm 27 is a gear-segment 30, and connected rigidly to a shorter lever-arm 31 is a corresponding but reversely-disposed gear-segment 32. For the purpose of this description the shorter lever-arm is designated as the "supplemental" lever-arm, and the same is pivoted at 33 to the ceiling of the cab 23, as by a bracket 39, and provided at its terminal with a handle 34 and a spring-controlled pawl 35 for engagement with a toothed segment 36, connected, as by brackets 37, to the ceiling of the cab 23. The system of levers is thus disposed above the engineer's head entirely out of the way of any other of the various levers, valves, and apparatus within the cab, while at the same time in convenient position for operation from the engineer's seat, which is indicated at 38. It will be obvious that by this simple arrangement the movement of the handle end 34 of the supplemental lever-arm 31 will correspondingly move the primary lever-arm 27 through the coaction of the gear-segments 30 32, the shorter or supplemental lever-arm thus exerting a strong leverage force upon the primary lever-arm. By this means the headlight may be turned to throw the rays of light to any desired angle, which will be very convenient in running upon curves, as the light may thus be caused to follow the track as the train proceeds.

The rods 21 27 are provided with turnbuckles, as at 39 40, to provide means for adjusting the rods. The swinging headlight will also be found useful for other purposes—for instance, for illuminating the territory at the sides of the track or for signaling by a system of flash-lights or otherwise.

The invention is simple in construction and can be readily applied to any of the various makes of locomotives and headlights.

Having thus described the invention, what is claimed is—

In a device of the class described, a pivoted headlight a primary lever pivoted intermediate its ends, rods connecting said headlight at opposite sides to the ends of the said primary lever, a gear-segment connected to said primary lever and concentric to its pivot, a secondary lever pivoted intermediate its ends, a gear-segment connected to said secondary lever and intermeshing with the gear-segment on said primary lever, a keeper extending beneath said secondary lever and supporting the same and provided with spaced teeth disposed concentric to the pivot of said secondary lever, and a pawl movably connected to said secondary lever and engaging said spaced teeth.

In testimony that I claim the foregoing as my own I have hereto affixed my signature in the presence of two witnesses.

WILLIAM H. DONALDSON.

Witnesses:
F. C. WILCOX,
T. A. MASON.